(12) United States Patent
Andrewes

(10) Patent No.: US 8,533,963 B2
(45) Date of Patent: Sep. 17, 2013

(54) SUNDIAL WITH ELEVATED GNOMON SUPPORT AVOIDING SHADOW ECLIPSE

(76) Inventor: William J. H. Andrewes, Concord, MA (US)

( * ) Notice: Subject to any disclaimer, the term of this patent is extended or adjusted under 35 U.S.C. 154(b) by 175 days.

(21) Appl. No.: 13/304,029

(22) Filed: Nov. 23, 2011

(65) Prior Publication Data

US 2013/0025141 A1    Jan. 31, 2013

Related U.S. Application Data

(63) Continuation-in-part of application No. 12/879,734, filed on Sep. 10, 2010, now Pat. No. 8,065,808.

(60) Provisional application No. 61/276,464, filed on Sep. 11, 2009.

(51) Int. Cl.
*G04B 49/02* (2006.01)

(52) U.S. Cl.
USPC .............................. 33/270; 368/15

(58) Field of Classification Search
USPC .................................................. 33/268–271
See application file for complete search history.

(56) References Cited

U.S. PATENT DOCUMENTS

| | | | | | |
|---|---|---|---|---|---|
| 2,762,123 | A | * | 9/1956 | Schultz et al. | 33/268 |
| 4,922,619 | A | * | 5/1990 | Singleton | 33/270 |
| 6,009,628 | A | * | 1/2000 | Mizushima | 33/270 |
| 6,604,290 | B1 | * | 8/2003 | Hughes, Jr. | 33/270 |
| 7,114,262 | B2 | * | 10/2006 | Andrewes | 33/270 |
| 8,221,125 | B2 | * | 7/2012 | Darling | 368/21 |
| 2009/0044417 | A1 | * | 2/2009 | Chen | 33/269 |
| 2013/0000134 | A1 | * | 1/2013 | Keele | 33/270 |

* cited by examiner

*Primary Examiner* — G. Bradley Bennett
(74) *Attorney, Agent, or Firm* — Burns & Levinson LLP; Jerry Cohen

(57) ABSTRACT

A hemispheric armillary with arms and supporting a structure for supporting a gnomon over a time indicating dial plate is constructed to avoid the arms' shadows from eclipsing the gnomon shadow on the dial plate.

3 Claims, 10 Drawing Sheets

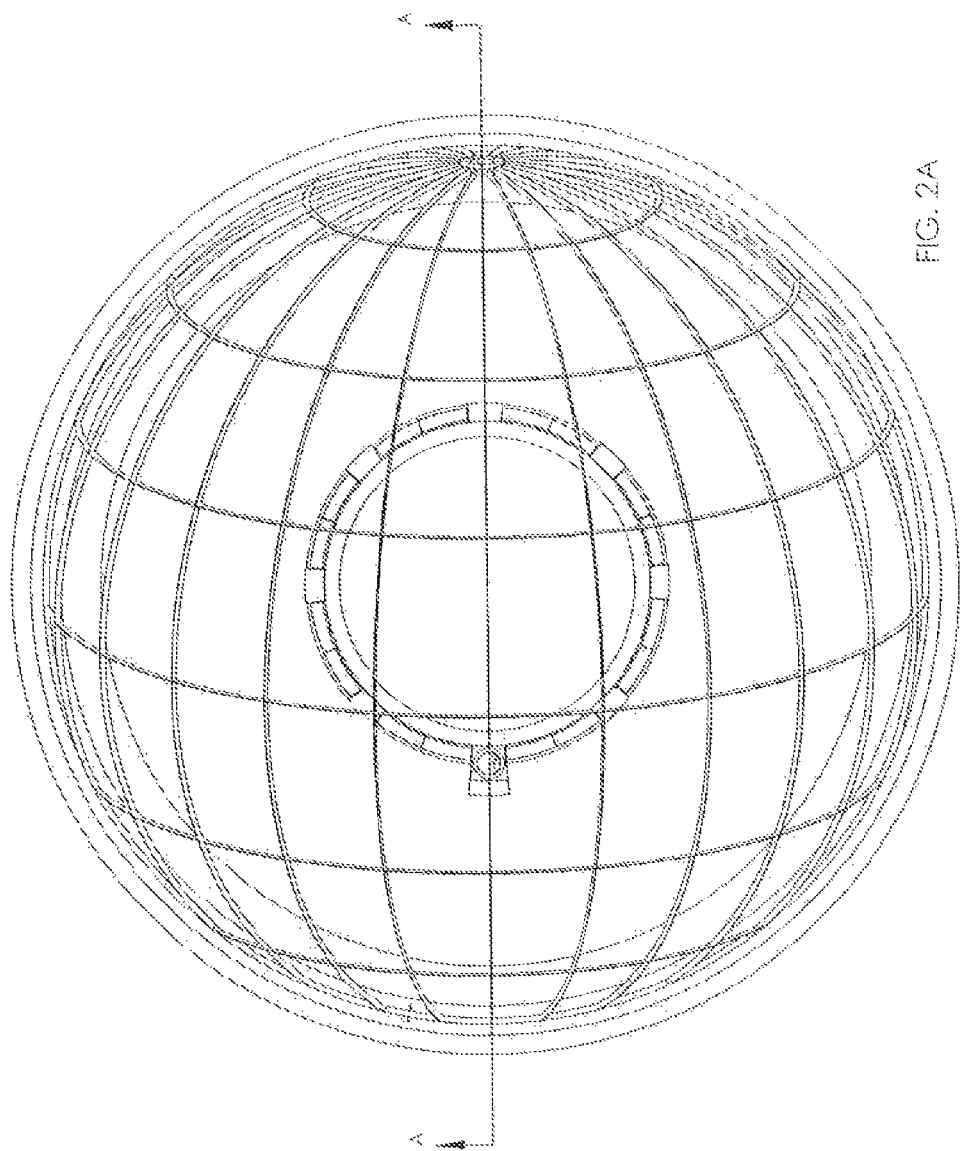

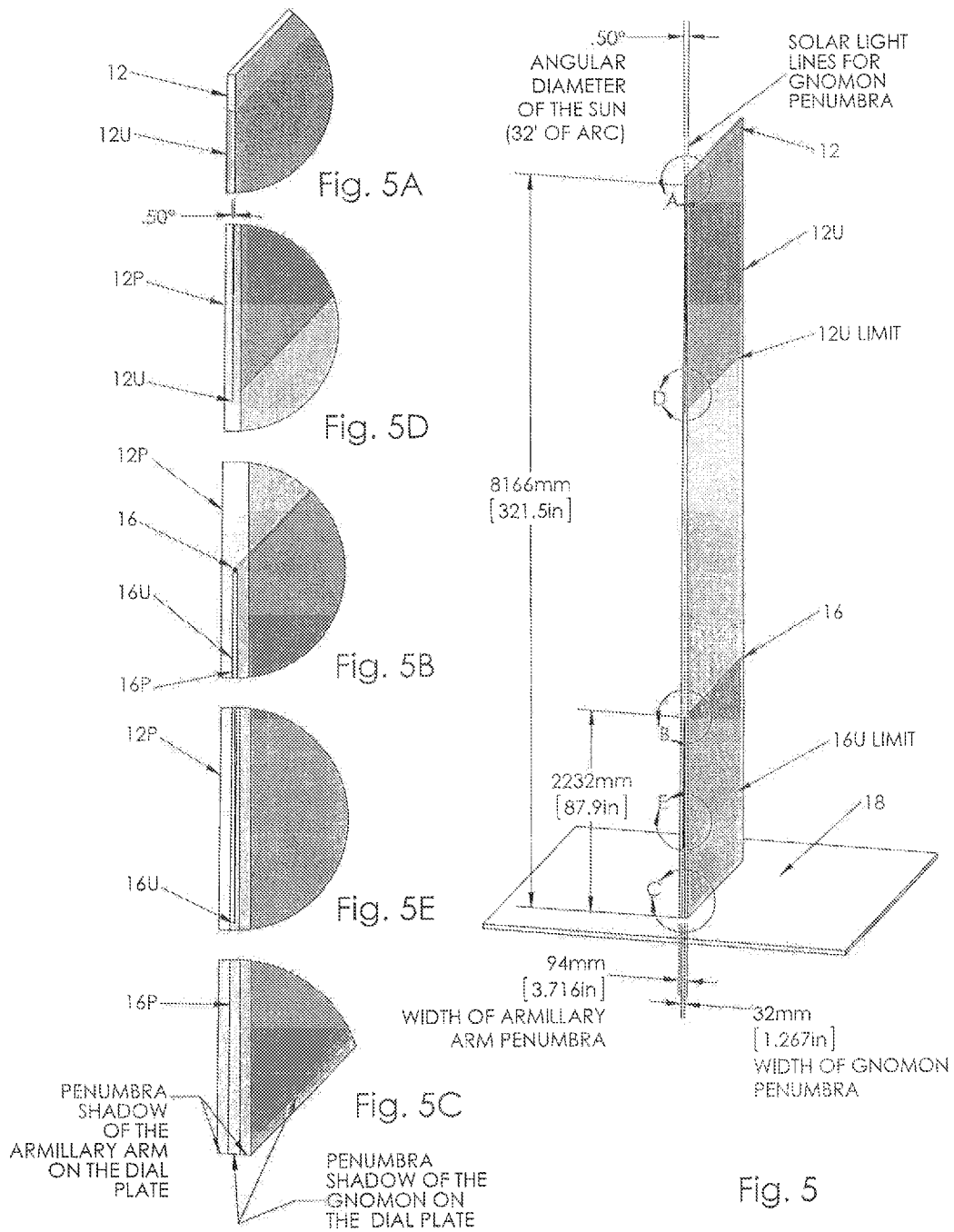

SUNDIAL WITH ELEVATED GNOMON SUPPORT AVOIDING SHADOW ECLIPSE

CROSS-REFERENCE TO RELATED APPLICATIONS

This application is a continuation-in-part of co-pending U.S. patent application Ser. No. 12/879,734, filed Sep. 10, 2010, and entitled SUNDIAL WITH DOME AND GRID OF LIGHT, which in turn claims priority to U.S. Provisional Application Ser. No. 61/276,464, filed Sep. 11, 2009, the entire contents of which are hereby incorporated by reference for all purposes.

FIELD AND BACKGROUND OF THE INVENTION

The invention described herein pertains to supporting grids for a gnomon in a sundial structure and addresses the problem of shadow interference—i.e., shadow obstruction of a gnomon shadow by shadows of a supporting grid (e.g., a hemispheric armillary with arcuate arms along the spherical virtual surface tied to crossing rings to form the grid). During the course of the day, shadows of the arms of the armillary hemisphere will align with the gnomon in relation to the sun and eclipse the gnomon shadow completely, making it difficult at such intervals to tell the time.

SUMMARY OF THE INVENTION

Per the present invention, steps are taken to overcome the problem where an armillary hemisphere is greatly simplified, e.g., with rings, marking only the hour divisions, the Equator, the Tropics, and the Arctic Circle. See FIGS. 1 and 2. Instead of limiting the light to a single beam indicating the time on a dial plate, this simplified hemisphere supports an elevated gnomon, which tells the time by its shadow on a dial plate divided with hour and minute markers.

The problem of the shadow interference is overcome in this invention by structure to assure that the shadow of the arms of the support structure, e.g. an armillary hemisphere, will not eclipse the gnomon's shadow even when they are aligned. This involves imposing a substantially rectangular cross-section of the arms, with sides substantially parallel to the direction of sun rays which minimizes their radial shadows on the dial, as shown below, without compromising the structural integrity of the support structure, e.g. an armillary hemisphere.

Other objects, features and advantages will be apparent from the following detailed description of preferred embodiments taken in conjunction with the accompanying drawings in which:

BRIEF DESCRIPTION OF THE DRAWINGS

FIG. 2A is a top view of the assembly;

FIGS. 5 and 5A-5E show the several detail of shadow umbra/penumbra generation in ¾ view at an arm at the gnomon and the overlapping of umbras/penumbras yielding a net fully visible gnomon or shadow at all times of the solar day;

DETAILED DESCRIPTION OF PREFERRED EMBODIMENTS

Figure 1:
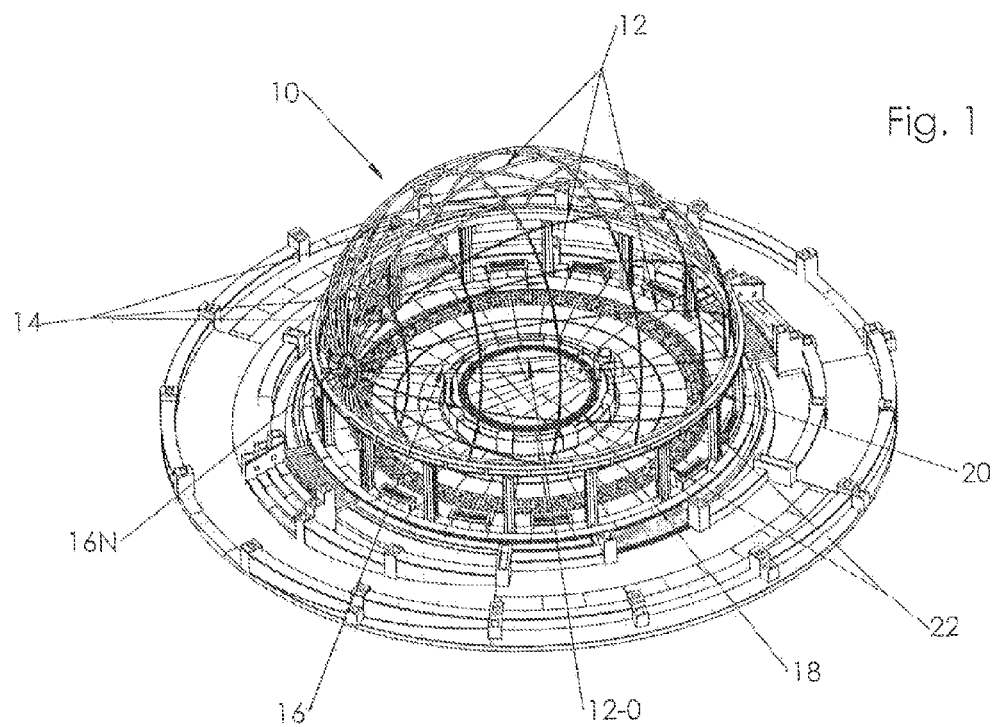
FIG. 1 shows a general isometric view of a hemispheric armillary assembly as per an embodiment of the invention as seen from the North-West.
Figure 2:
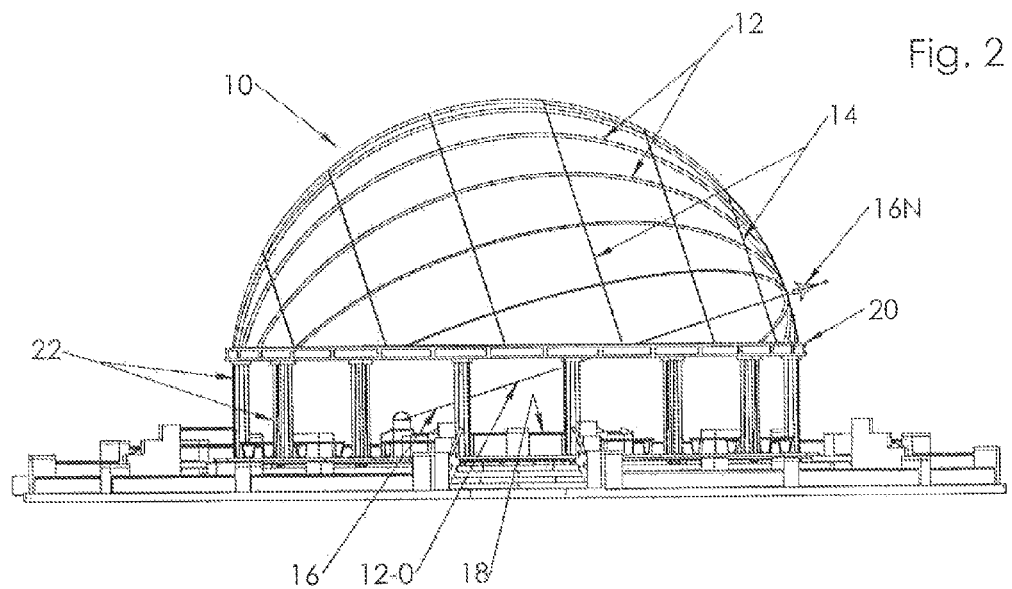
FIG. 2 is a simplified rendering in side view of the overall geometry the assembly.
Figure 2B:
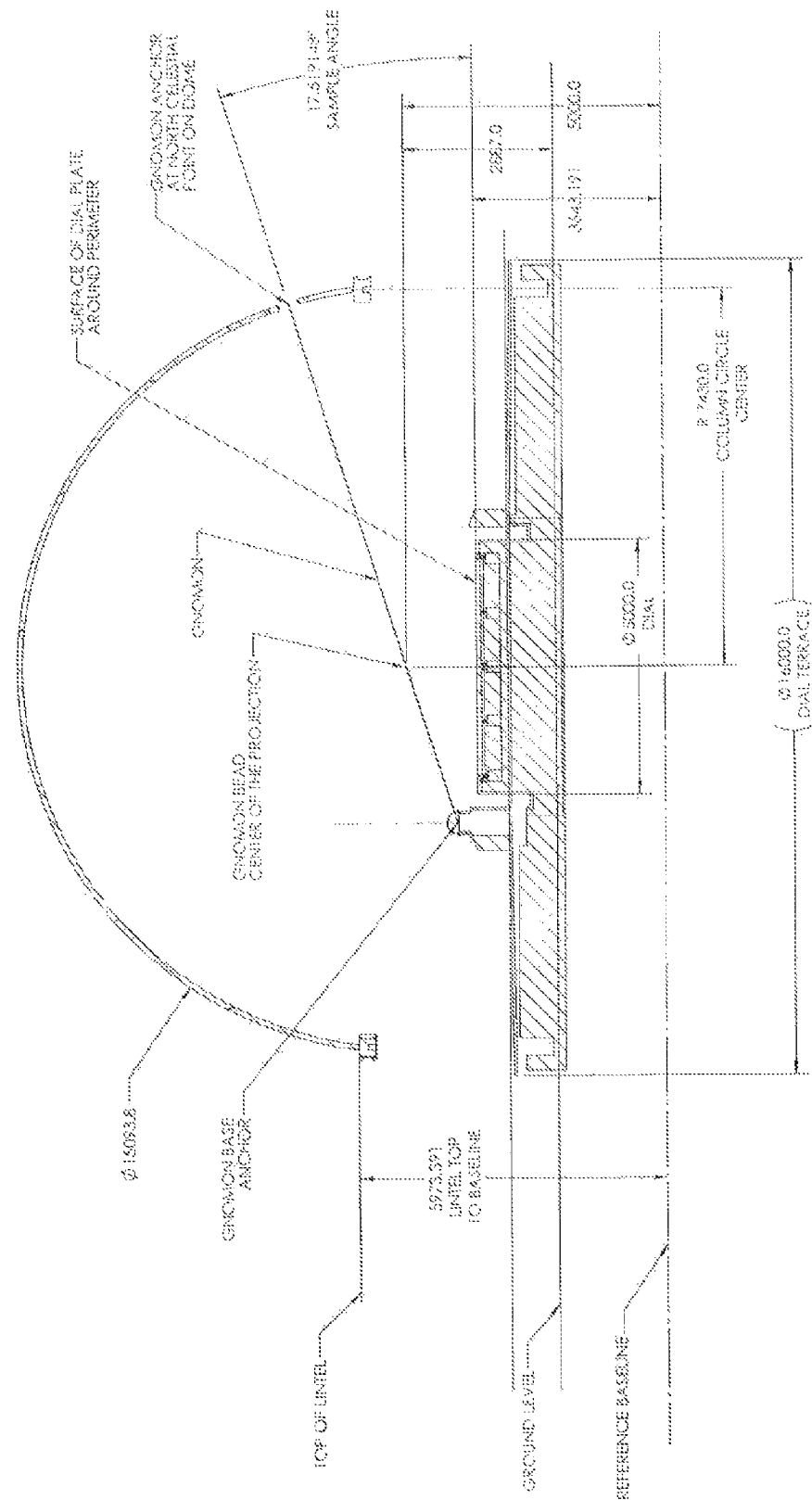
FIG. 2B is a dimensioned cross-section of FIG. 2, the section taken as shown by outline A-A of the top view of FIG. 2A.
Figure 3:
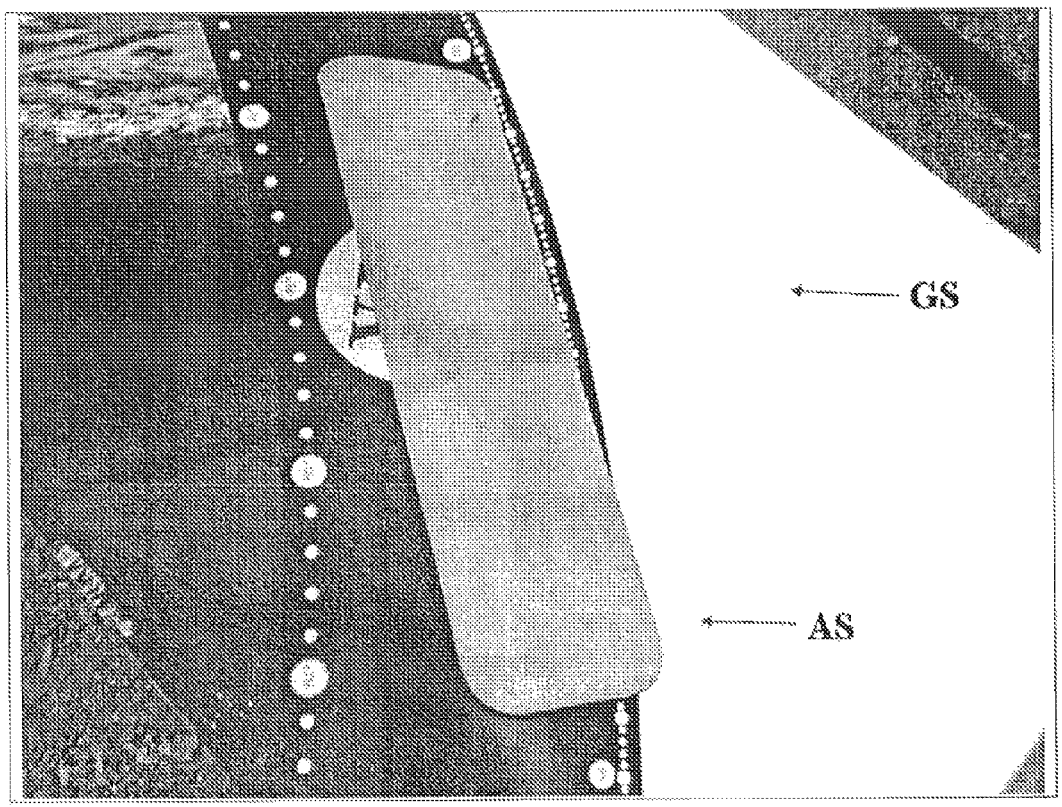
FIG. 3 shows an experiment based on the FIGS. 1-2 (and 2A, 2B) embodiment, i.e. a photograph with the shadow of the gnomon clearly depicted (on a metal plate inserted as background) as well as the non-eclipsing shadow of an arm of the armillary hemisphere.

FIGS. 1, 2, 2A-2B and 3 show an embodiment of armillary sundial and the FIGS. 4A-4C, 5, 5A-5E and 6 show how arm shadows therein do not eclipse the gnomon shadow. FIG. 1 is an isometric view of the sundial assembly 10 having a hemispheric grid of circular arms marking lines of longitude 12 and the parallels of latitude 14, both centered on a common point of origin 12.0 on the gnomon 16 (the shadow casting wire). 12.0 is also the center of the dial and map projection. This support structure supports a gnomon 16 with a North pointing arrow 16N above a dial plate 18 to form an armillary hemisphere (with virtual completion of the sphere shown in FIG. 2B) supporting the gnomon and its North-pointing arrow (for use in Northern Hemisphere of the Earth). The armillary hemispherical dome is supported by a lintel 20, which in turn is supported by columns 22. In this instance, the gnomon is at about 17.5 degree inclination to the equatorial plane (for a Mexico location at that latitude of the sundial assembly). Typically, the dome diameter is 15 meters (m) and it is supported 8.75 m above the dial plate and columns 22 are 9.5 m apart to form square openings with a bottom 0.75 m below the dial plate. A circular terrace surrounds the dial plate. FIG. 3 shows a gnomon shadow GS and a non-eclipsing nearest arm shadow AS. A metal strip is inserted to provide contrast to the arm and gnomon shadows. The dial area with a customary compass rose is surrounded by a moat, so it appears as an island floating on water. Steps and bridges provide access from the North, East and South and there are ramps to the bridge at the West entrance, all as indicated in FIG. 2

Figure 4A:
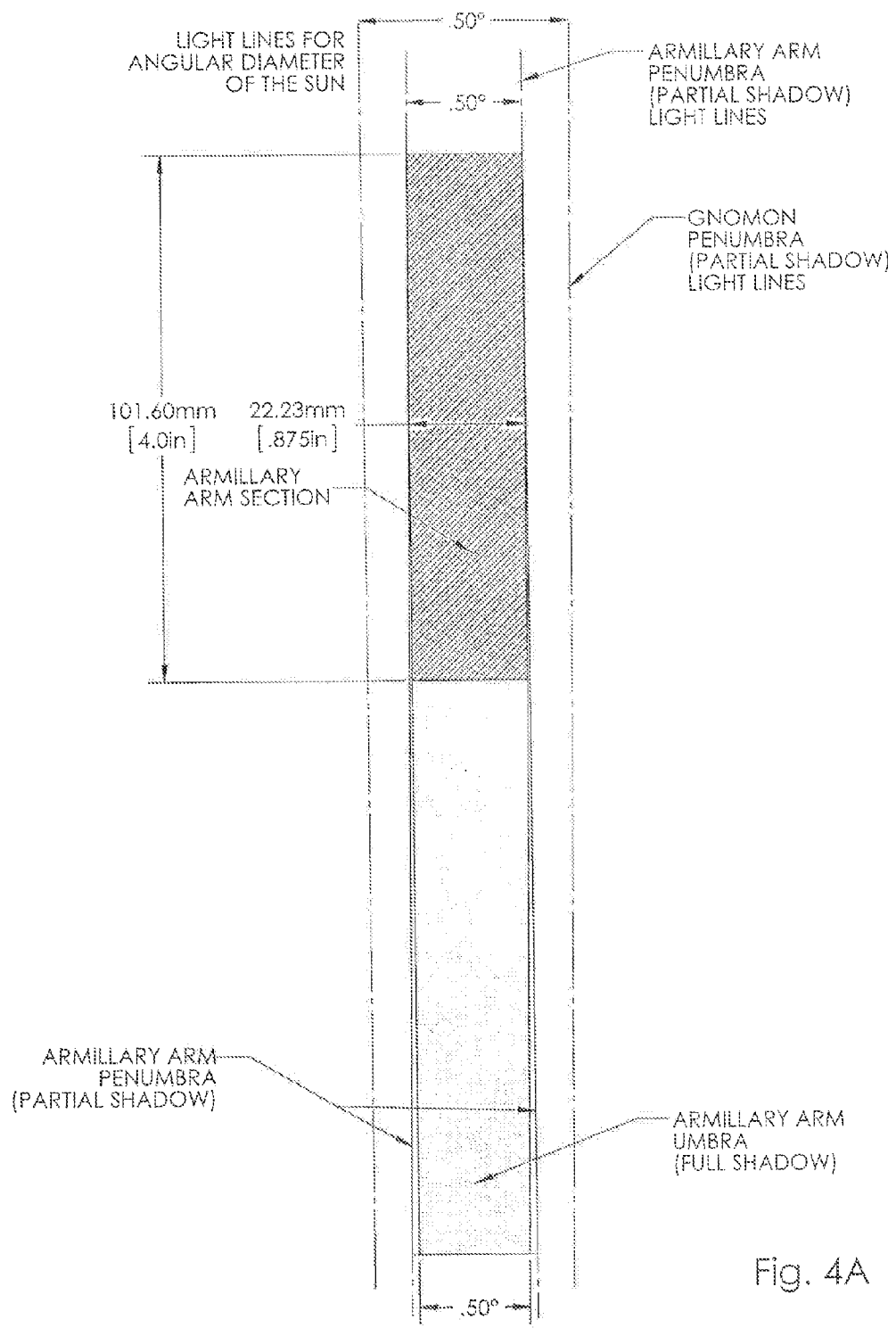
FIGS. 4A-4C are shadow studies showing the relationship of the armillary hemisphere arms, the gnomon and the dial plate.
Figure 4B:
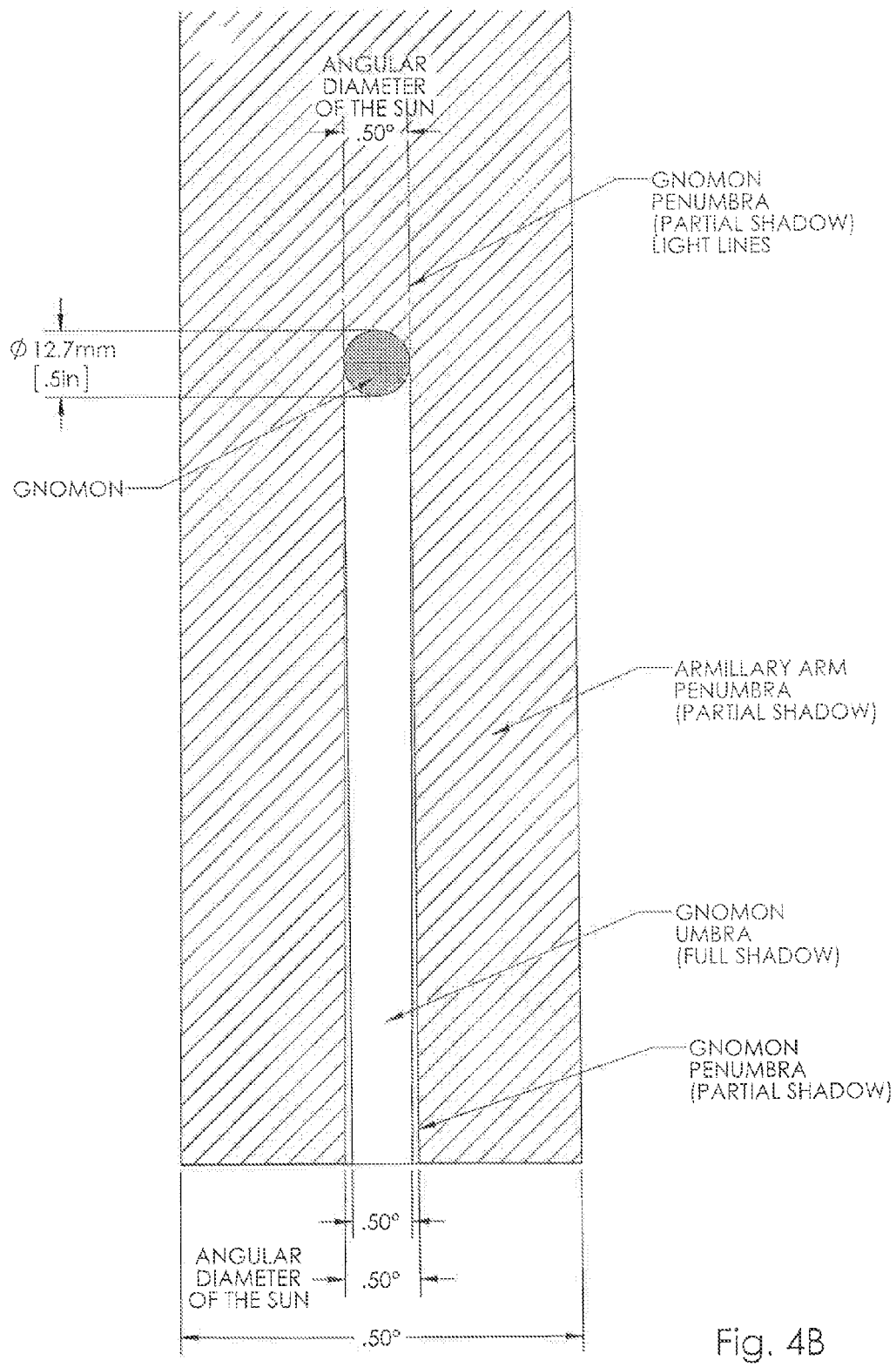
Figure 4C:
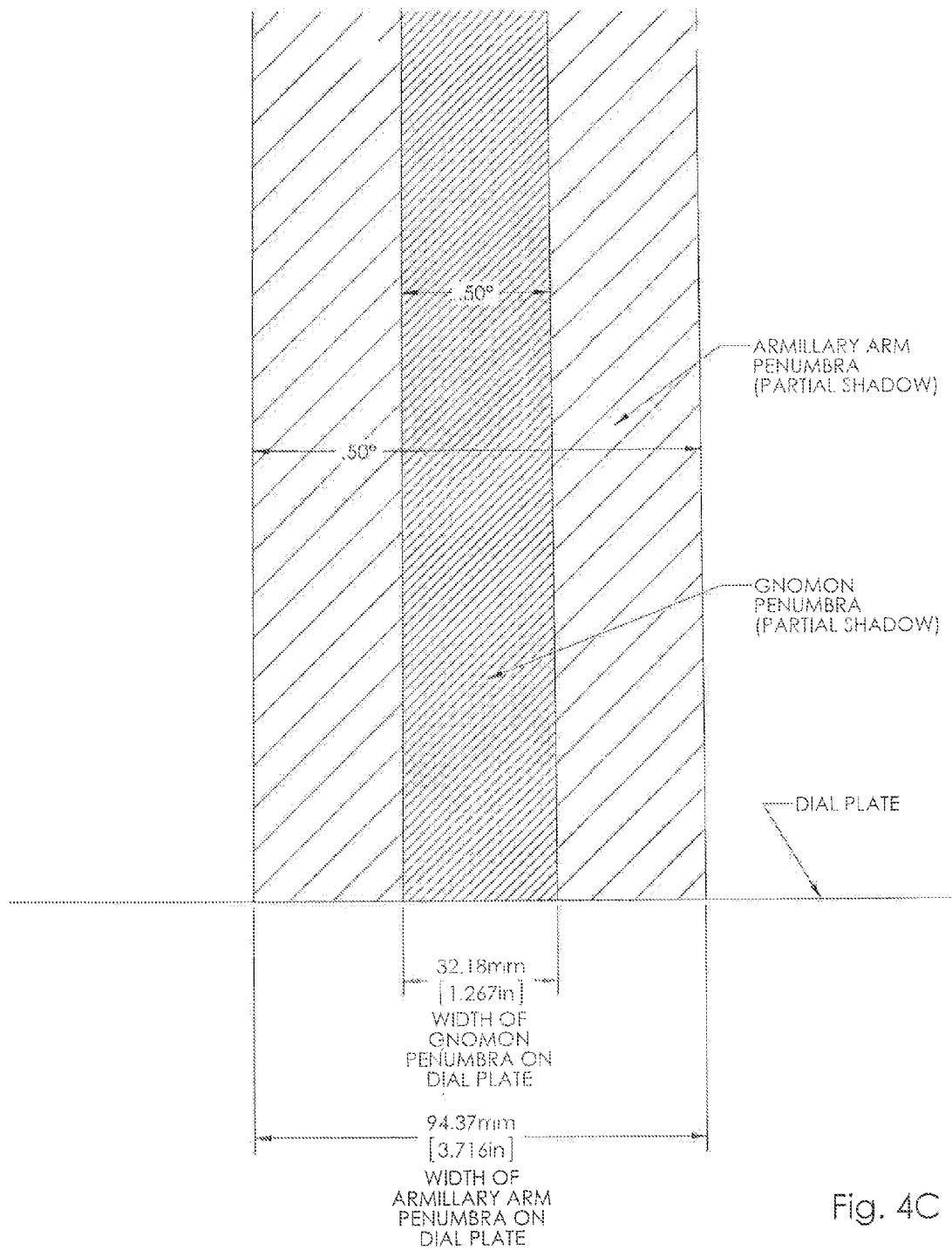
Figure 6:
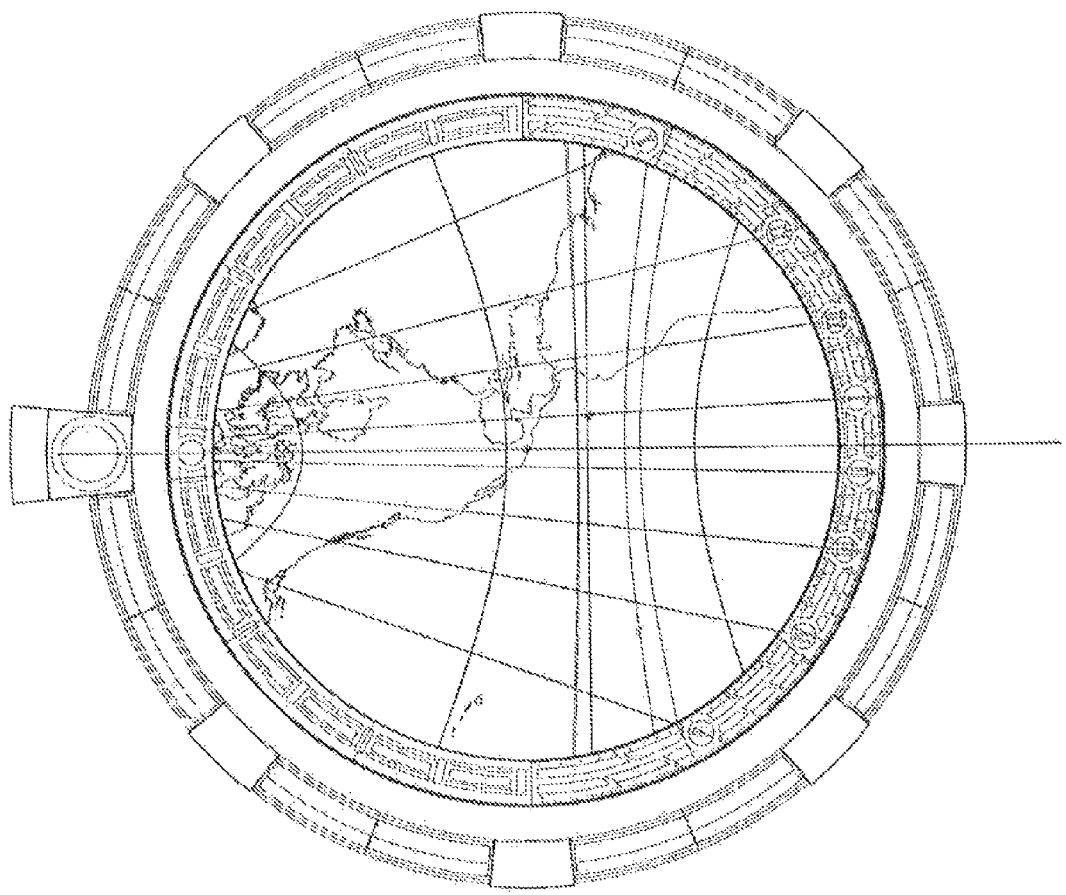
FIG. 6 shows detail of the dial plate in one embodiment.
Figure 7:
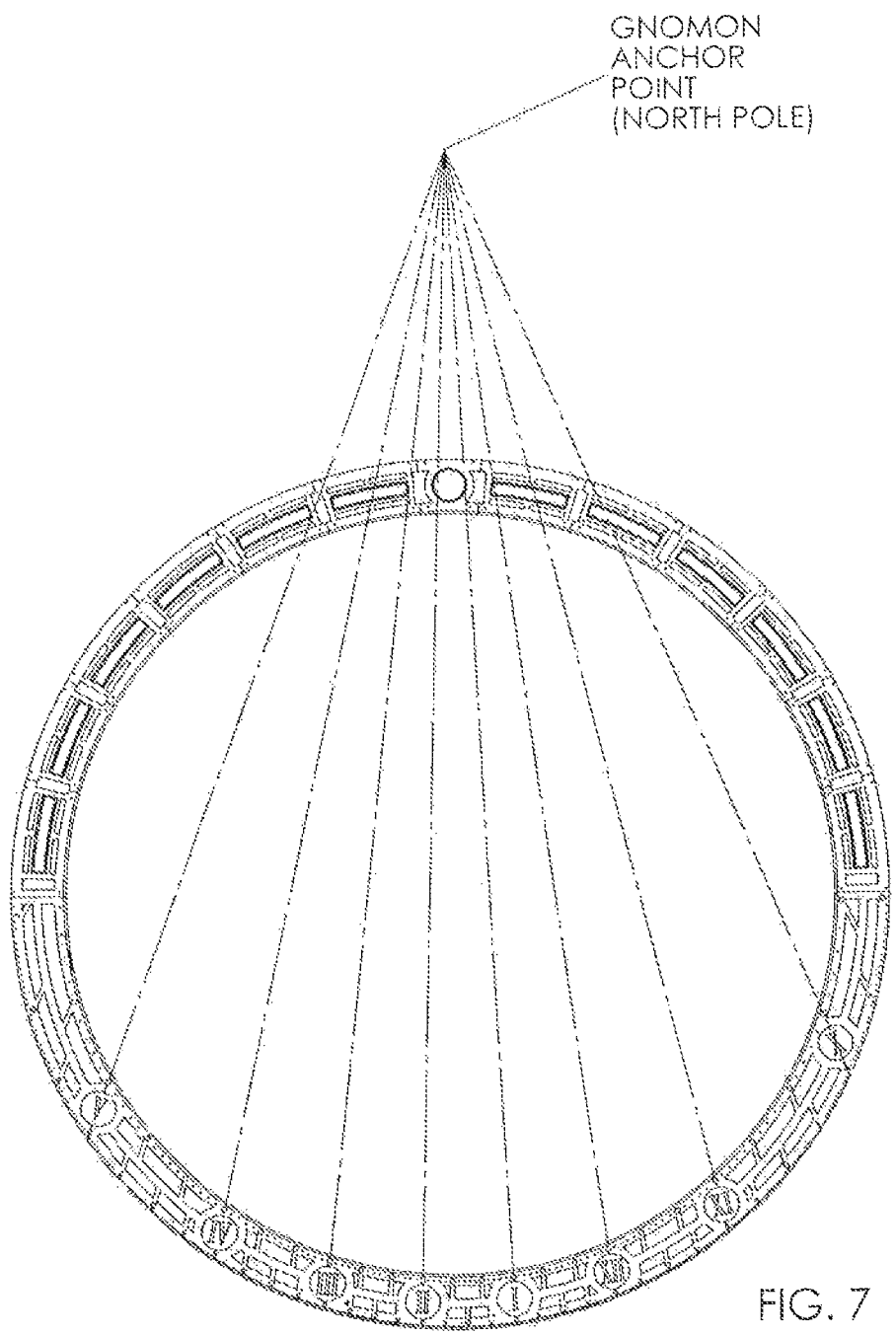
FIG. 7 is a simplified rendering of the dial plate showing a gnomon anchor point.

The shadow studies of FIGS. 4A-4C depict a worst-case scenario in the relationship of the armillary hemisphere arms, the gnomon, and the dial plate. In these figures, the arm of the armillary hemisphere, the gnomon, and the dial plate are shown. Even when the arm and the gnomon are aligned, some direct light from the sun still reaches the gnomon, which therefore casts a visible shadow on the dial plate. The photograph of FIG. 3 shows an actual experiment based on the diagram: while the gnomon's shadow is clearly defined, the penumbra of the arm can hardly be seen.

FIG. 5 and breakout details at FIGS. 5A-5E show an armillary arm 12, the dial plate 18, and gnomon wire 16 with the umbra 12U of armillary arm 12, the umbra 16U of the gnomon wire, and limits (12U-LIMIT and 16U-LIMIT) and also shows angular diameter of the sun and resultant width of armillary arm penumbra and width of gnomon penumbra with dimensions in a typical situation showing why the arms' shadows will not eclipse the gnomon's shadow even when an arm and the gnomon are fully aligned. Because the diameter of the sun as viewed from Earth is about 0.5° (actually a maximum of 32.5' of arc), the full shadow area (the umbra) of the arm ends at 12U, after which only the partial shadow (the penumbra) is visible, and this fades as the distance increases. Although the gnomon wire 16 ends at 16U, its penumbra is still far more pronounced than the penumbra of arm 12.

The armillary arms are typically arced bars of stainless steel of rectangular cross section, i.e. with essentially parallel width sides and an aspect ratio of width to thickness (aspect ratio) over 1.0 and typically with an aspect ratio of about five for requisite structural strength consistent with structural integrity and thinnest feasible thickness, e.g. $7/8$th inch thick and four inches wide at the size of the above-described structure. The thickness direction is essentially perpendicular to the general direction of the sun rays.

The gnomon is typically a metal wire of diameter of round or essentially square cross section form (aspect ratio of about 1.0) with diameter or like thickness dimension perpendicular to sun rays direction and being of less than arm thickness. Round is preferred shape as a non-circular cross-section would lead to a variable gnomon shadow width.

The general structural arrangement among light source, arm or beam, gnomon and target surface allows for several variations of form and usage apart from the above described embodiment. For example the gnomon can be straight or bent and/or multiplied to parallel or other separate forms (e.g. as outlines of regular or irregular forms) or crossing, e.g. as grids, sight reticles or otherwise, and with multiple gnomon parts touching or bonded or separately spaced along the vector(s) of light projection, all using the above embodiments' arrangements of protecting the gnomon shadow projection on a distant surface from total eclipse by umbra of arms or beams but allowing aim of beam penumbra overlap with the gnomon umbra.

Target surfaces and /or sources can move relatively to each other. The light source can be a central emission point radially projecting to a target via one or more intervening arms or beams and gnomon(s)—the opposite of the sundial arrangement. Either or both of the source or target can be small or large areas (or small or large virtual areas). Relative movement can be through physical movement or scanning arrays of light sources and/or of exposed target surface sections without physical movement or combinations of physical movement and scanning arrays.

Through these or other variations new and useful utilitarian or aesthetic structures for umbra/penumbra management can be made for preventing total gnomon eclipse by one or more arms or beams intervening between light source and gnomon including, without limitation, structures for surveying, astronomy, geology, mapping, architecture, aircraft and other vehicle tracking, light/shadow displays for entertainment or education purposes. The invention can also be applied on a micro-scale to scientific instruments.

The invention including the above variants and preferred embodiments can be practiced in the visible light spectral range and/or above or below such range.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Sundial assembly with an elevated gnomon above a time indicating surface (e.g. dial plate) on support structure having spaced arms above the gnomon with tops exposed to the sun, having substantially parallel sidewalls substantially parallel to sun rays passing between them and of limited thickness, consistent with structural integrity, the apparatus as a whole constructed and arranged so that shadows of the arms on the time indicating surface do not eclipse the gnomon shadow on the time indicating surface due to limitations of the umbra and penumbra of the arm and gnomon shadows on the time indicating surface.

2. The assembly of claim 1 wherein the support structure is a hemispheric armillary.

3. An apparatus for management of gnomon shadowing in relation to a light source comprising a gnomon constructed and arranged between a light source and target surface for projecting a gnomon shadow at the surface at different ratios due to relative movement of the surface, gnomon and/or source, at least one beam structure between the gnomon and source also projecting a shadow on the target surface and the gnomon and beam being so constructed and arranged to prevent total eclipsing of the gnomon shadow by the beam shadow.

* * * * *